(12) United States Patent
Chancellor (10) Patent No.: US 12,089,603 B2
(45) Date of Patent: Sep. 17, 2024

(54) WHOLE BIRD CHILLER CLEAN IN PLACE (71) Applicant: John Bean Technologies Corporation, Chicago, IL (US)

(72) Inventor: Darin L. Chancellor, Russellville, AR (US)

(73) Assignee: John Bean Technologies Corporation, Chicago, IL (US)

( * ) Notice: Subject to any disclaimer, the term of this patent is extended or adjusted under 35 U.S.C. 154(b) by 555 days.

(21) Appl. No.: 17/204,567

(22) Filed: Mar. 17, 2021

(65) Prior Publication Data
US 2021/0289798 A1  Sep. 23, 2021

Related U.S. Application Data (60) Provisional application No. 62/990,976, filed on Mar. 17, 2020.

(51) Int. Cl.
 *A22B 5/00* (2006.01)
 *A22C 21/00* (2006.01)

(52) U.S. Cl.
 CPC ............ *A22B 5/0076* (2013.01); *A22C 21/00* (2013.01); *A22C 21/0053* (2013.01)

(58) Field of Classification Search
 CPC ....... A22B 5/0076; A22B 5/0082; A22B 5/18; A22C 21/00; A22C 21/0053; A22C 17/04; A22C 17/08; A22C 17/16; A22C 21/0061; A22C 25/02
 See application file for complete search history.

(56) References Cited

U.S. PATENT DOCUMENTS

| | | | |
|---|---|---|---|
| 3,410,101 A | | 11/1968 | Morris, Jr. |
| 4,829,637 A | * | 5/1989 | Norrie ...................... A22B 5/08 |
| | | | 452/173 |
| 4,955,403 A | * | 9/1990 | Zappa et al. ............. C23G 5/04 |
| | | | 134/109 |
| 6,397,622 B1 | | 6/2002 | Miller et al. |
| 9,089,143 B2 | | 7/2015 | Estes |
| 9,089,149 B2 | | 7/2015 | Estes |
| 9,717,256 B2 | | 8/2017 | Shell |

(Continued)

FOREIGN PATENT DOCUMENTS

| | | | | |
|---|---|---|---|---|
| CN | 207191896 U | * | 4/2018 | ............. B65D 81/18 |
| EP | 2759203 A1 | | 7/2014 | |

(Continued)

OTHER PUBLICATIONS

JP 5234956 B2 Translation (Year: 2013).*

(Continued)

*Primary Examiner* — Elizabeth J Martin
*Assistant Examiner* — Dario Antonio Deleon
(74) *Attorney, Agent, or Firm* — Christensen O'Connor Johnson Kindness PLLC (57) ABSTRACT

A poultry chiller comprises a tank having a conveyor within the interior for urging poultry for movement along the tank, wherein the tank has an opening extending along a length of the tank, and a cleaning system for automatically cleaning the interior of the tank, the cleaning system comprising a plurality of distribution nozzles extending along the tank to direct cleaning fluid to the interior surface of the tank. Retrofitting kits are provided to automate cleaning in place of chiller tanks.

23 Claims, 3 Drawing Sheets

(56) References Cited

U.S. PATENT DOCUMENTS

| | | | | |
|---|---|---|---|---|
| 2004/0144123 A1* | 7/2004 | Bass | ................... | A22B 5/0076 |
| | | | | 62/374 |
| 2014/0202659 A1* | 7/2014 | Wakita et al. | ......... | A22C 21/00 |
| | | | | 165/85 |
| 2018/0279635 A1* | 4/2018 | Walsh et al. | ........... | A22C 17/08 |
| 2019/0274320 A1* | 9/2019 | Shell | ................. | A22C 21/0053 |
| 2021/0378250 A1* | 12/2021 | Li et al. | ............... | A22B 5/0082 |

FOREIGN PATENT DOCUMENTS

| | | | | |
|---|---|---|---|---|
| JP | 2008-295447 A | 12/2008 | | |
| JP | 5234956 B2 * | 7/2013 | ............. | A22C 21/00 |
| WO | 2020/163699 A1 | 8/2020 | | |

OTHER PUBLICATIONS

CN 207191896 U Translation (Year: 2018).*
International Search Report and Written Opinion mailed Aug. 17, 2021, issued in corresponding International Application No. PCT/US2021/022789, filed Mar. 17, 2021, 19 pages.
International Preliminary Examination Report and Written Opinion of the International Searching Authority mailed Sep. 29, 2022, issued in corresponding International Application No. PCT/US2021/022789, filed Mar. 17, 2021, 13 pages.
Invitation to Pay Additional Fees and Communication Relating to the Results of the Partial International Search mailed Jun. 25, 2021 issued in corresponding International Application No. PCT/US2021/022789 filed Mar. 17, 2021, 16 pages.
Examiner's Report mailed Dec. 1, 2023, issued in corresponding Canadian Application No. 3,173,967, filed Mar. 17, 2021, 6 pages.

* cited by examiner

WHOLE BIRD CHILLER CLEAN IN PLACE

CROSS-REFERENCE(S) TO RELATED APPLICATION(S)

This application claims the benefit of U.S. Provisional Application No. 62/990,976 filed Mar. 17, 2020.

BACKGROUND

In the processing of poultry for human consumption, it is necessary that the slaughtered, eviscerated poultry carcasses be chilled as rapidly as possible. Various types of poultry chillers to accomplish the chilling of freshly killed poultry are known in the art. Poultry chillers typically employ chilled water to reduce the temperature of the poultry carcasses. Reference is made to U.S. Pat. Nos. 6,397,622; 9,089,143, 9,089,149, incorporated herein expressly by reference.

A type of chiller is the auger type in which an auger having a series of flights forms a generally helical structure that when rotated moves the poultry carcasses through a chilled water bath. Another type of chiller can have paddles. Another type of chiller can have an auger for part of the length of the chiller and paddles for unloading product.

In some chillers, the chilled water bath is not circulated, i.e., the water either remains in the chiller or is used one time only and discharged. The more common type, however, re-circulates the chilled water. The chilled water may either be circulated through the chiller in the same direction as the movement of the poultry carcasses, or more commonly, in a counter flow in which the chilled water and the poultry carcasses move through the chiller in opposite directions. Counter flow is known to more efficiently transfer heat from the poultry carcasses to the chilled water.

Two primary means are used to chill the water. One type, applies cooling to the walls of the chiller, such as by refrigeration coils built into the walls of the chiller or by using a jacket around the walls of the chiller in which a cooling fluid circulates.

In the other type of chiller, the chilled water is sent from the chiller to an external refrigeration source, such as an ammonia refrigeration system, that reduces the temperature of the water that is then re-circulated to the chiller. The external refrigeration may be supplied through a heat exchanger and refrigeration unit. The chilled water enters the chiller at one end, circulates through the chiller, and after being warmed by contact with the poultry carcasses, exits the chiller. The warmed water is again chilled by the refrigeration unit and re-circulated through the chiller.

Poultry chillers come in various cross-sectional shapes including a tank that is generally U-shaped in cross sectional outline, cylindrical or partly cylindrical, square shaped, or some other shape that does not conform closely to the outer edges of the auger. Most, if not all, poultry chillers can have an opening extending along the length of the chiller to allow for loading the poultry and visual inspection during production. Usually, the opening is along the top of the poultry chiller tank.

SUMMARY

A clean in place system can be incorporated into existing or newly built poultry chillers. In an example, the clean in place system utilizes the existing recirculation pump to pump water and cleaning fluid through distribution nozzles directed to the inside surfaces of the chiller tank, including the conveyor, such as auger, the auger shaft, and unloading paddles, and the like. The clean in place system may use an additional pump, where needed for flow and coverage to clean the system, particularly, the chiller tank.

Additional external pumps and tanks can also be used based on the particular installation. Valving systems, including automated valves can be incorporated to provide automation and control according to programmed sequences.

The clean in place system can operate in accordance with pre-programmed, but customizable sequences. In an example, a first timed sequence of steps will be to flush the chiller tank and the water will go from a tank outlet to a drain. A second timed sequence of steps includes switching the tank outlet from the drain to the catch basin from where the water will then be pumped back to the clean in place reservoir to establish a recirculating cleaning fluid loop for cleaning the chiller tank during which soap and chemicals can be added. This recirculation of the cleaning fluid through the chiller tank will reduce water usage as well as soap and chemicals. Once the cleaning process is complete, the tank outlet will then be switched back to the drain and the third timed sequence of steps begins for rinsing the chiller tank of cleaning fluid. In the rinse sequence, the remaining cleaning fluid and water will be discarded to the drain. Fresh water can be continuously added until the cleaning fluid has been rinsed from the inside surfaces of the chiller tank.

Piping will be both external and integral of the poultry chiller system. However, flexible hoses can be used to connect from the piping/chiller portions to each distribution nozzle location for distribution of water and cleaning fluid in accordance with the particular installation needs.

In an example, a clean in place system can include the use covers or hoods over the chiller tank opening for the distribution of water/spray nozzles along the top of the chiller tank. In addition, permanent or semi-permanent distribution nozzles can be added to the sides or on the shell of the chiller tank as well as the endplates on the chiller tank. The placement of the distribution nozzles is based on the particular chiller tank shape. Distribution nozzles can be placed into recessed pockets or buckets to avoid interfering with the rotation of moving pieces inside the chiller tank.

For a more automated system, the clean in place system can use a programmable logic controller that can control the position of valves as well as start and stop pumps remotely according to pre-programmed instructions. However, the system can allow for little or entire manual operation as well.

In an example, a poultry chiller comprises a tank having a conveyor within the interior for urging poultry for movement along the tank, wherein the tank has an opening extending along a length of the tank: and a cleaning system for automatically cleaning the interior of the tank, the cleaning system comprising a plurality of distribution nozzles extending along the tank to direct cleaning fluid to the interior surface of the tank.

In an example, a poultry chiller having a tank with a conveyor on the interior, a cleaning fluid reservoir, a recirculation pump having a pump inlet connected to a reservoir outlet and a recirculation pump outlet is switchable to a heat exchanger and a plurality of distribution nozzles on the tank, further comprises a programmable logic controller having a non-transitory computer readable medium having instructions stored thereon to execute the following steps, controlling the outlet from the recirculation pump to bypass the heat exchanger to discharge the recirculation pump outlet to the distribution nozzles, with the recirculation pump, pumping cleaning fluid from the reservoir to the distribution nozzles, and with the recirculation pump, pumping the cleaning fluid into the tank through the distribution nozzles, wherein after injecting, the cleaning fluid is collected and returned to a recirculation pump inlet.

In an example, the poultry chiller further comprises a second pump having a pump inlet connected to a tank outlet and a pump outlet connected to a reservoir inlet, wherein the non-transitory computer readable medium further has instructions stored thereon to execute the following step, with the second pump, pumping the cleaning fluid from the tank outlet to the reservoir inlet.

In an example, a poultry chiller having a tank with a conveyor on the interior, a cleaning fluid reservoir, a recirculation pump having a pump inlet connected to a reservoir outlet and a pump outlet is switchable to a heat exchanger and a plurality of distribution nozzles on the tank, a second pump having a pump inlet connected to a tank outlet and a pump outlet connected to a reservoir inlet, the tank outlet is switchable to a drain and the second pump inlet, further comprises a programmable logic controller having a non-transitory computer readable medium having instructions stored thereon to execute the following steps:
  (a). switching the tank outlet to the second pump inlet;
  (b) switching the outlet from the recirculation pump to bypass the heat exchanger to discharge the recirculation pump outlet to the distribution nozzles;
  (c) pumping cleaning fluid from the reservoir to inside the tank through the distribution nozzles with the recirculation pump;
  (d) pumping the cleaning fluid inside the tank from the tank outlet to the reservoir inlet, and
  (e) performing steps (c) and (d) for a period of time to clean the tank.

In an example, the non-transitory computer readable medium further has instructions stored thereon to execute the following step, after step (e), perform step (f) switching the tank outlet to the drain to empty the tank of cleaning fluid.

In an example, the non-transitory computer readable medium further has instructions stored thereon to execute the following step:
  (g) pumping water from the reservoir outlet to inside the tank through the distribution nozzles with the recirculation pump to rinse the tank of cleaning fluid.

In an example, the non-transitory computer readable medium further has instructions stored thereon to execute the following step, before step (a), switching the tank outlet to the drain: and pumping water from the reservoir outlet to inside the tank through the distribution nozzles with the recirculation pump to flush the tank.

In an example, a poultry chiller comprises a tank having a conveyor within the interior, wherein the tank has opening extending along a length of the tank and laterally extending from a first side wall to a second side wall of the tank; and a cover over the opening, wherein the cover has distribution nozzles being directed to the interior of the tank and other parts thereof.

In an example, the poultry chiller further comprises a recirculation pump with inlet and outlet, wherein the pump inlet is connected to a tank outlet and the pump outlet is connected to the distribution nozzles.

In an example, the poultry chiller further comprises distribution nozzles on the first and second side walls of the tank.

In an example, the distribution nozzles are placed on the tank directed inward not extending past the inside diameter of the tank.

In an example, the distribution nozzles are placed in a row extending longitudinally along the tank on both the first and second side walls.

In an example, the distribution nozzles of a cylindrical tank are placed at 4 o'clock, 8 o'clock, and 12 o'clock position, wherein the nozzles at the 12 o'clock position are located on the cover.

In an example, the opening is at a top of the tank.

In an example, a poultry chiller comprises a tank having a conveyor within the interior, wherein the tank has an opening extending along a length of the tank and laterally extending from a first side wall to a second side wall of the tank; and a recirculation pump with inlet and outlet, wherein the pump inlet is connected to a tank outlet and the pump outlet is connected to an inlet of a heat exchanger, and a heat exchanger outlet is connected to an inlet on the tank, and the pump outlet is further connected to a plurality of distribution nozzles located at the tank.

In an example, the poultry chiller further comprises one or more automated valves to configure the pump outlet to bypass the heat exchanger to the plurality of distribution nozzles.

In an example, the poultry chiller further comprises a second pump with inlet and outlet, wherein the second pump inlet is connected to a tank outlet, and the tank outlet is switchable from the second pump inlet to a drain.

In an example, a retro-fit kit for installing on a poultry chiller tank having a conveyor within the interior, wherein the tank has an opening extending along a length of the tank and laterally extending from a first side wall to a second side wall of the tank, and the kit comprises a cover having a plurality of distribution nozzles, the cover is configured to be installed over the tank opening, wherein the distribution nozzles are directed into the tank and the other interior parts thereof.

In an example, a retro-fit kit for installing on a poultry chiller tank having a conveyor within the interior, wherein the tank has an opening extending along a length of the tank and laterally extending from a first side wall to a second side wall of the tank, and the kit comprises one or more valves configured to switch a recirculation pump discharge from a heat exchanger to one or more distribution nozzles on the tank.

In an example, the retro-fit kit further comprises one or more valves configured to switch a tank outlet from a drain to a second pump inlet.

In an example, a retro-fit kit for installing on a poultry chiller tank having a conveyor within the interior, wherein the tank has an opening extending along a length of the tank and laterally extending from a first side wall to a second side wall of the tank, and the kit comprises a programmable logic controller, having a non-transitory computer readable medium having instructions stored thereon to execute the following step, switching a recirculation pump outlet from a heat exchanger to distribution nozzles located on the tank to discharge cleaning fluid in the interior of the tank.

In an example, the non-transitory computer readable medium further has instructions stored thereon to execute the following steps, switching a tank outlet from a drain to a second pump inlet: and starting the recirculation pump to pump cleaning fluid into the tank through the distribution nozzles; and starting the second pump to recirculate cleaning fluid from the tank back to the recirculation pump.

In an example, the non-transitory computer readable medium further has instructions stored thereon to execute the following steps, after a first time period of operating the recirculation pump and second pump to recirculate cleaning fluid, switching the tank outlet from second pump inlet to the drain outlet to dispose of the cleaning fluid.

In an example, a method of cleaning a poultry chiller having a tank with a conveyor on the interior, a cleaning fluid reservoir, a recirculation pump having a pump inlet connected to a reservoir outlet and a pump outlet is switchable to a heat exchanger and a plurality of distribution nozzles on the tank, a second pump having a pump inlet connected to a tank outlet and a pump outlet connected to a reservoir inlet, the tank outlet is switchable to a drain and the second pump inlet, and the method comprises the following steps:

(a) filling the reservoir with flush water;
(b) switching the tank outlet to the drain;
(c) switching the outlet from the recirculation pump to bypass the heat exchanger to discharge the recirculation pump outlet to the distribution nozzles;
(d) pumping the flush water from the reservoir to inside the tank through the distribution nozzles with the recirculation pump to flush the tank;
(e) filling the reservoir with a cleaning fluid;
(f) switching the tank outlet to the second pump inlet;
(g) pumping the cleaning fluid from the reservoir to inside the tank through the distribution nozzles with the recirculation pump;
(h) pumping the cleaning fluid from the tank to the reservoir with the second pump;
(i) performing steps (g) and (h) for a timed period;
(i) switching the tank outlet to the drain to empty the tank of cleaning fluid;
(j) filling the reservoir with rinse water; and
(k) pumping the rinse water from the reservoir to inside the tank through the distribution nozzles with the recirculation pump to rinse the tank of the cleaning fluid.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure can be applicable to all chiller tanks. In a representative example, an auger type poultry chiller with counter flow in which the chilled water is re-circulated through an external refrigeration unit is used for illustrating aspects of the disclosure. However, the disclosure is not limited to the examples.

Currently a poultry chiller has to be manually cleaned, usually once a day after a production run. Disclosed herein, is an automated system to eliminate and/or reduce the need for human labor. This will reduce the safety concerns with cleaning a whole bird poultry chiller.

The poultry chiller of this disclosure can be a newly built chiller or a retro-fitted chiller to provide for a "clean in place" system to alleviate the need for manual cleaning, particularly the inside of the tank including the auger or other conveyor. The clean in place system can be automated and be incorporated with a current poultry chiller control system to eliminate the manual or "personnel" needed to clean systems as well as eliminate safety concerns with manual clean in place design.

Figure 1:
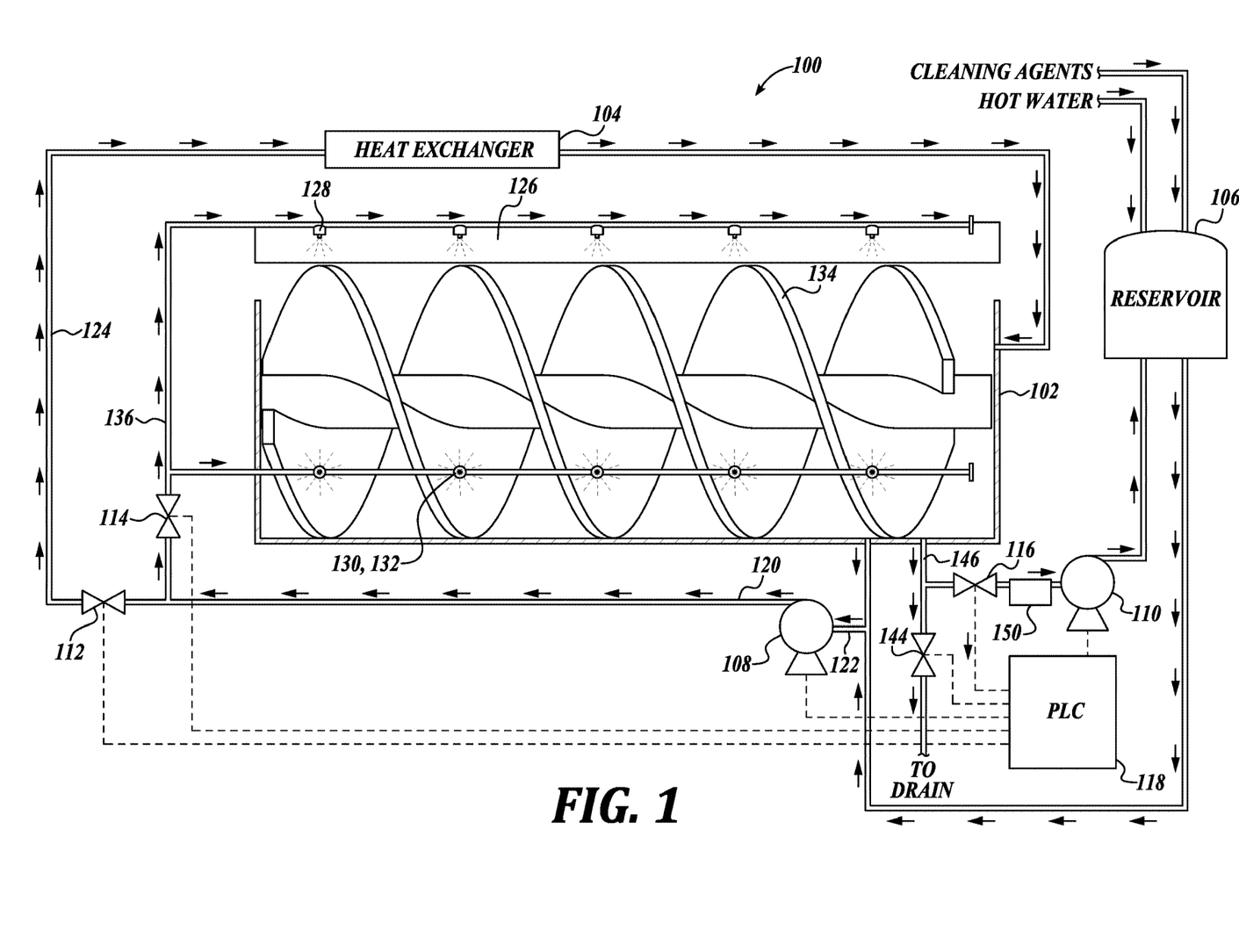
FIG. 1 is a diagrammatical illustration of a poultry chiller in accordance with one example of this disclosure.

FIG. 1 illustrates an example of a poultry chiller system 100 capable of performing cleaning of any one or more of the tank, auger (or other conveyor), and associated piping. The poultry chiller system 100 of FIG. 1 can represent a newly built system or an existing system that is retro-fitted to be clean in place capable.

Figure 2:
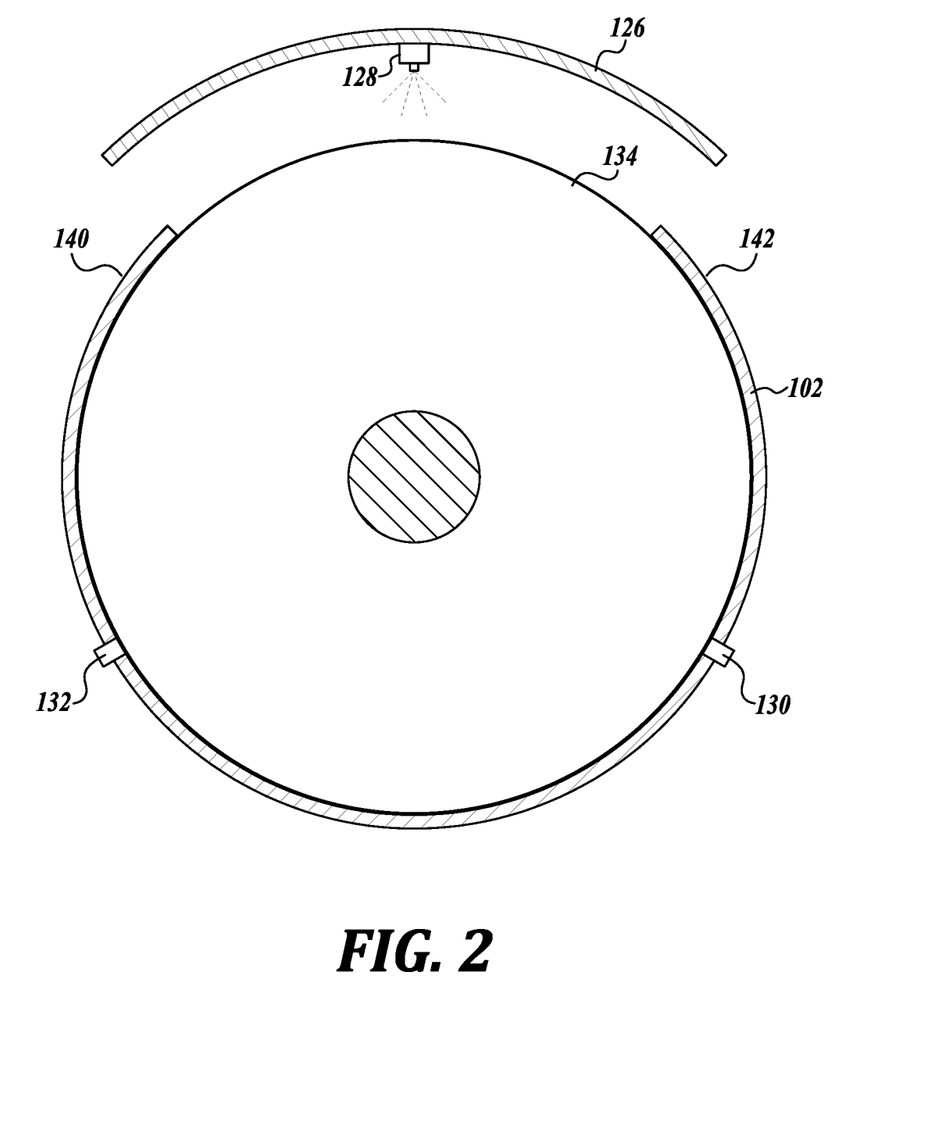
FIG. 2 is a diagrammatical illustration of a poultry chiller in accordance with one example of this disclosure.

A newly built or retro-fitted tank 102 can include an auger 134 (or other conveyor) configured to rotate within the tank 102. In an example, the tank 102 can be used for chilling poultry via the introduction of chilled water from a heat exchanger 104 where warm water enters that heat exchanger from the tank 102, and then passes into the heat exchanger 104 where the warm water is chilled with a refrigerant. In an example, the tank 102 has a cylindrical shape at least partly along its cross section. In an example, the tank 102 is open at the top as shown in FIG. 2 so that the auger 134 protrudes above the edges of the tank sidewalls 140 and 142.

Referring to FIG. 1, the tank 102 includes an automated start/stop recirculation pump 108 having a pump inlet 122 coming from the tank 102 outlet or a reservoir 106 outlet. It is to be appreciated that the recirculation pump 108 can serve multiple uses. In one example, the recirculation pump 108 is used during a production run to continuously recirculate warm water from the tank 102 to the heat exchanger 104 back to the tank 102. In another example, the recirculation pump 108 is used for cleaning the heat exchanger 104 by pumping a cleaning fluid from the reservoir 106 to the heat exchanger back to the reservoir. In another example, it has been found that the recirculation pump 108 can be put to a new use to clean the tank 102 by retro-fitting existing chillers or building new chillers having distribution nozzles 130, 132 directed inward to spray the cleaning fluid on the inside of the tank 102.

Accordingly, newly built or retro-fitted chillers can have a recirculation pump outlet 120 that is switchable to discharge into a line 124 that leads to an inlet on the heat exchanger 104 or discharge into a line 136 that leads to the distribution nozzles 130, 132 on the tank 102. In order to spray the tank 102 from the top, an option is to provide a removable cover 126 over the tank 102 opening, where the cover 126 is then provided with distribution nozzles 128 directed toward the inside of the tank 102 and other interior parts thereof.

In order to provide automated switching capability to the pump outlet 120 discharge, an automated valve 112 is placed after the pump outlet 120 on the line 124 to the heat exchanger 104, and an automated valve 114 is placed after the pump outlet on the line 136 leading to the distribution nozzles 128, 130, or 132. Therefore, as can be appreciated, the pump outlet 120 can be configured to discharge to the heat exchanger 104 or to the distribution nozzles 128, 130, or 132. The timing of the valve switching can be programmed into a programmable logic controller as further described herein. Although, valves 112 and 114 are illustrated as a representative valving example, it is possible to replace valves 112 and 114 with a three-way valve having one inlet and two mutually exclusive outlets discharging to either line 124 or line 126.

Referring to FIGS. 1 and 2, in one example, the distribution nozzles 130 and 132 can be placed in rows that are parallel to the central axis of the tank 102. In one example, a row of distribution nozzles can be placed at the 4 o'clock and the 8 o'clock position with relation to the cross section of the tank 102. In any case, it is advantageous to locate distribution nozzles in sufficient quantity to allow the wetting of surfaces of the tank 102 and auger 134 regardless of tank or auger shape. This may include providing nozzles at or near the bottom (6 o'clock) of the tank 102. In cases where the tank 102 is partly open, such as on the top, a cover 126 can be fitted with a row of distribution nozzles 128, so that the distribution nozzles 128 can spray the inside of the tank from the 12 o'clock position. In one example, the cover 126 has a cross section that is likewise curved and can be supported by resting on the sidewalls 140, 142 defining the opening of the tank 102. The cover 126 can match closely with the dimensions of the tank opening in both length and width.

In one example, distribution nozzles 128, 130, and 132 are permanent fixtures and therefore, have to be placed to prevent parts of the nozzles from projecting on the inside surface of the tank 102. This will prevent the auger 134 from hitting against the nozzles.

In one example, the distribution nozzles 128, 130, and 132 can have a wide spray pattern or a narrow spray pattern. In one example the distribution nozzles 128, 130, and 132 can have a conical spray pattern, a flat spray pattern, or a narrow stream. In one example, the spray pattern is adjustable.

The flow rate at each nozzle can vary. In one example, the flow rate of each nozzle is in the range of 10 to 30 gallons per minute. In one example, the flow rate at each nozzle is in the range of 15 to 25 gallons per minute. In one example, the flow rate of each nozzle is about 21 gallons per minute. The pressure at the nozzle can vary. In one example, the pressure is from 60 psi to 100 psi. In one example, the pressure is from 70 to 90 psi. In one example, the pressure is from 75 to 80 psi.

Based on the number of nozzles and size of the tank 102, the total flow can vary. In one example, the recirculation pump 108 can pump about 400 to 800 gallons per minute. In one example, the recirculation pump 108 can pump about 500 to 700 gallons per minute. In one example, the recirculation pump 108 can pump about 550 to 600 gallons per minute.

In one example, the poultry chiller system 100 includes a reservoir 106. Generally, the reservoir 106 is an existing piece of equipment that is currently used for cleaning the heat exchanger 104 by recirculating cleaning fluid using the recirculation pump 108 and same piping normally used for chilling water, but the cleaning fluid is returned to the reservoir 106, thereby creating a recirculation cleaning loop from the reservoir 106 to the pump 108, to the heat exchanger 104, and back to the reservoir 106. In this disclosure, the piping from the pump 108 and piping to and from the reservoir 106 can be retro-fitted to further enable cleaning the tank 102 and auger 134 using the same pump 108. The reservoir 106 can at times contain water fed from a hot water source, such as a boiler. Hot water can be used for the initial water flush step and the final rinse step as described below. Additionally, cleaning agents can be added to the reservoir 106 to be mixed with the water to provide a cleaning fluid. The cleaning fluid is used in the recirculating cleaning step of the tank 102 as described below.

In an example, to automate the recirculating cleaning step of the tank 102, an automated valve 144 is put on a tank outlet 146 leading to the drain. The drain is for discharging the tank contents out the system, which may further be treated before discharging to a public utility. Additionally, an automated valve 116 is placed on a branch line from the drain which is connected to a catch basin 150. The catch basin 150 is connected to the inlet of the automated start/stop pump 110. In one example, the automated pump 110 would need to be retro-fitted to some existing systems. The outlet from the pump 110 is then connected to a reservoir inlet at the reservoir 106. Although, the example uses two valves 116 and 144, a single three-way valve can be used in place of the valves 116 and 144. A three-valve has one inlet and two mutually exclusive outlets. Accordingly, the tank outlet 146 is automatically switchable to the drain or to the catch basin 150, pump 110, and reservoir 106. The timing of the valve switching can be programmed into a programmable logic controller as further described herein.

In one example, the valves 112, 114, 116, 144 are automated and can be opened and closed by control logic residing on the programmable logic controller 118. In one example, the pumps 108 and 110 are automated to turn on and off, or speed controlled, by control logic residing on the programmable logic controller 118. Different types of computing devices can be used for the programmable logic controller 118.

In an example, the controller 118 includes at least one processor and a system memory. Depending on the exact configuration and type of controller 118, the system memory may be volatile or nonvolatile memory, such as read only memory ("ROM"), random access memory ("RAM"), EEPROM, flash memory, or similar memory technology. Those of ordinary skill in the art and others will recognize that system memory typically stores data and/or program modules that are immediately accessible to and/or currently being operated on by the processor. In this regard, the processor may serve as a computational center of the controller 118 by supporting the execution of programmed logical instructions.

In an example, the controller 118 may include a network interface comprising one or more components for communicating with other devices over a network. As will be appreciated by one of ordinary skill in the art, the network interface may represent one or more wireless interfaces or physical communication interfaces described and illustrated above with respect to particular components of the controller 118.

In an example, the controller 118 also includes a storage medium. The storage medium may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory and storage medium are merely examples of computer-readable media.

Suitable implementations of controller 118, system memory, communication bus, storage medium, and network interface are known and commercially available. For ease of illustration and because it is not important for an understanding of the claimed subject matter, FIG. 1 does not show some of the typical components of many controllers. In this regard, the controller 118 may include input devices, such as a keyboard, keypad, mouse, microphone, touch input device, touch screen, tablet, and/or the like. Such input devices may be coupled to the controller 118 by wired or wireless connections.

In this disclosure, controller 118 includes instructions embodied in hardware or software for performing certain steps. Such instructions can be written in a programming language. The instructions may be compiled into executable programs or written in interpreted programming languages. The instructions can be stored in any type of computer-readable medium or computer storage device and be stored on and executed by the controller 118, thus creating a special purpose computer configured to provide the functionality thereof. The controller 118 is particularly used to control the timing and/or sequence of operation of, for example, the valves 112, 114, 116, 144, and pumps 108 and 110. While an example is provided illustrating the automated operation of the valves 112, 114, 116, 144, and pumps 108 and 110, it is within the scope of this disclosure that similar operations can be performed manually by persons, either wholly or partly.

Figure 3:
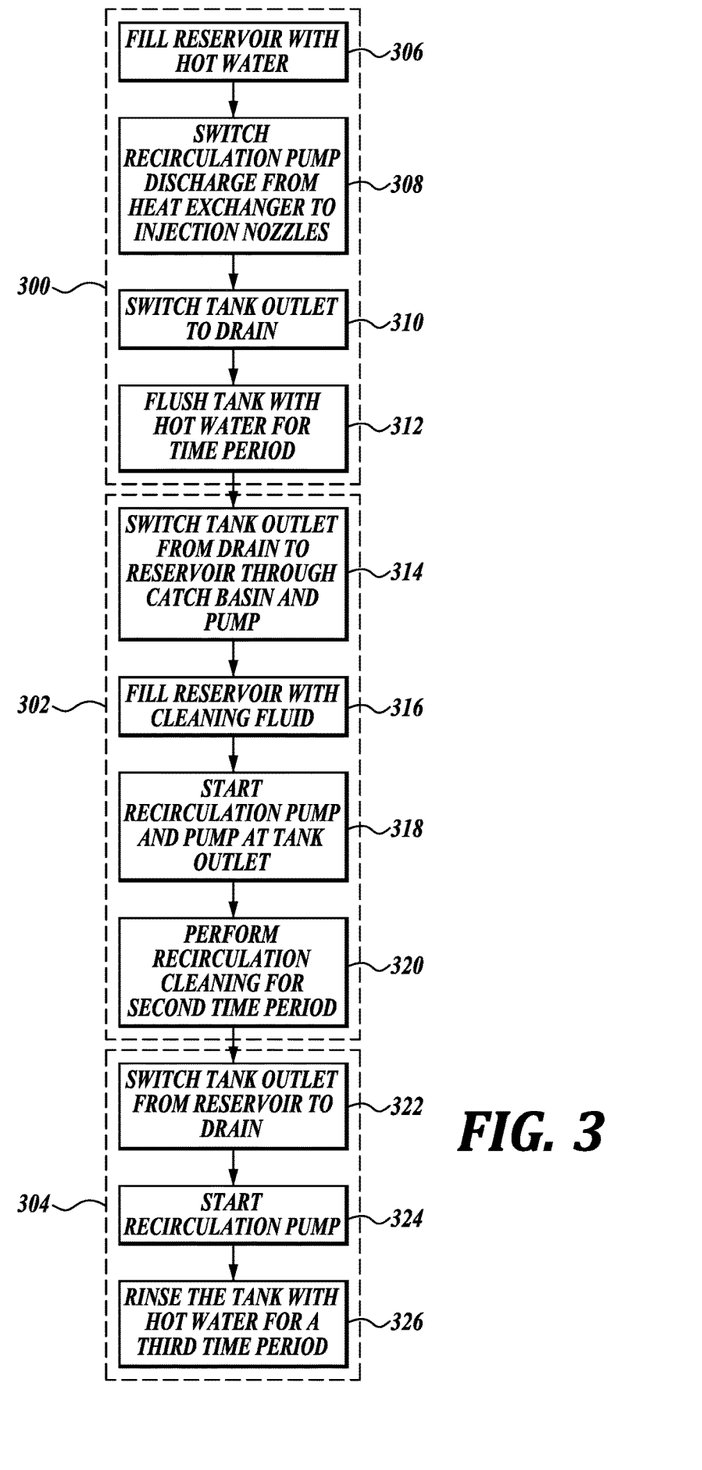
FIG. 3 is a flow diagram of a method of cleaning a tank in accordance with one example of this disclosure.

Referring to FIG. 3, a flow diagram of one example of a cleaning process for the tank 102 is illustrated. Although an automated process is illustrated, any of the steps can be manually performed, or the method can be performed using a combination of manual and automated steps.

It is to be appreciated that the intended production mode of the poultry chiller system 100 is to use the recirculation pump 108 for recirculating warm water from the tank 102 to the heat exchanger 104 to chill the water, and then return the chilled water back to the tank 102. The method illustrated in FIG. 3 is a cleaning method after a production run has been completed. The method may involve manually placing the cover 126 over the opening on the tank 102. The method may also involve manually connecting hoses from the pump outlet 120 to the various distribution nozzle headers.

Generally, a cleaning method includes three sequences of flushing 300, recirculation cleaning 302, and rinsing 304. Each sequence can further be divided into one or more steps. It is possible to perform steps out of order or include additional steps or omit steps if the overall result is similar. One example of a cleaning method is illustrated. However, modifications can be made, either because the system is not fully automated or the particular system uses additional, less, or different equipment.

A flush sequence 300 is performed on the tank 102 to remove residue left after a production run. The flush sequence 300 may include several sub-steps. In block 306, the reservoir 106 is filled with hot water. At this time, the pumps 108 and 110 can be turned off. The flush sequence 300 includes switching the valves 112, 114 or a three-way valve, to discharge the recirculation pump outlet 120 to the spray nozzles 130, 132, and 128 bypassing the heat exchanger, block 308. This can be accomplished automatically by closing valve 112 and opening valve 114. The flush sequence 300 includes switching the tank outlet 146 to the drain, block 310. This can be accomplished automatically by closing valve 116 and opening valve 144. The programmable logic controller 118 can have interlocks to prevent starting the recirculation pump 108 until confirmation is received that the valves 112, 114, 116, and 144 are correctly aligned. Then, the programmable logic controller 118 can start the recirculation pump 108 which draws the hot water from the reservoir outlet into the pump inlet 122. As the water level in the reservoir 106 drops, hot water can be added to keep the level constant in the reservoir 106. The hot water is pumped by pump 108 out through the distribution nozzles 128, 130, and 132. The hot water then leaves the tank 102 and system through the drain. The flushing of the tank 102 with hot water can be based on a certain time period, block 312. Once the time is expired or it is determined through other means, such as visual inspection, that the flushing is acceptable, the recirculation pump 108 can be turned off.

After the flush sequence 300, a recirculation cleaning sequence 302 can begin. The recirculation cleaning sequence 302 can including the following steps. In the recirculation cleaning sequence, the recirculation pump outlet 120 still discharges to the distribution nozzles 128, 130, 130. The tank outlet 146 is switched from the drain to the catch basin 150, pump 110, and reservoir 106, block 314. This can be accomplished automatically by closing valve 144 and opening valve 116, or any other suitable valve arrangement. The reservoir 106 is filled with a cleaning fluid, which may include a combination of cleaning agents and water, block 316. The programmable logic controller 118 can have interlocks to prevent starting the pumps 108 and 110 until confirmation is received that the valves 112, 114, 116, and 144 are correctly aligned. Then, the programmable logic controller 118 can start the recirculation pump 108 which draws the cleaning fluid from the reservoir outlet into the pump inlet 122, and then pumps the cleaning fluid through the distribution nozzles 128, 130, 132, block 318. As the level in the reservoir 106 drops, the pump 110 can be started to return the cleaning fluid from the tank outlet 146 to a reservoir inlet, block 318. The two pumps 108 and 110 establish a recirculation loop to use the same cleaning fluid over and over to clean the tank 102. In one example, it is possible to add additional hot water or cleaning agents to the reservoir 106 during the recirculation cleaning. For example, it is possible that small amounts of cleaning fluid can be discharged via the drain periodically to lower the waste levels in the cleaning fluid. The recirculation cleaning of the tank 102 with the cleaning fluid can be based on a certain time period, block 320. Once the time is expired or it is determined through other means, such as visual inspection, that the recirculation cleaning is acceptable, the pumps 108 and 110 can be turned off. An advantage of recycling the cleaning fluid over and over realizes significant savings in water and cleaning agents. In an example, the cleaning fluid is allowed to become saturated or nearly saturated with high levels of waste to utilize the maximize cleaning potential of the cleaning fluid.

After the recirculation cleaning sequence 302, a rinse sequence 304 begins. The rinse sequence 304 can include the following steps. In the rinse sequence 304, the recirculation pump outlet 120 still discharges to the distribution nozzles 128, 130, 130. The tank outlet 146 is switched from the catch basin 150, pump 110, and reservoir 106 to the drain, block 322. This can be accomplished automatically by closing valve 116 and opening valve 144. The programmable logic controller 118 can have interlocks to prevent starting the recirculation pump 108 until confirmation is received that the valves 112, 114, 116, and 144 are correctly aligned. Then, the programmable logic controller 118 can start the pump 108 which draws down the remaining cleaning fluid from the reservoir 106 which is pumped into the tank 102 through the distribution nozzles 1298, 130, 132, block 324. As the level in the reservoir 106 drops, hot water can be added to replace the cleaning fluid and to keep the level constant in the reservoir 106. The remaining cleaning fluid becomes more dilute as hot water continues to be added to the reservoir 106. Eventually, the remaining cleaning fluid in the tank 102 has been completely rinsed from the inside surfaces of the tank. The cleaning fluid and hot water leave the tank 102 and system through the drain. The rinsing of the tank 102 with hot water can continue based on a certain time period, block 326. Once the time is expired or it is determined through other means, such as visual inspection, that the rinsing is acceptable, the pump 108 can be turned off.

After the rinse sequence 304 is complete, the cleaning method may be at an end, and the system 100 can be prepared for the next production run.

Modifications to the cleaning process are possible based on the particular configuration of equipment and piping of the particular poultry chiller system In an example, it may be possible to design a system that does not have the reservoir 106, in which case, the hot water and cleaning agents can be added directly into the tank 102, and the tank outlet 146 can be connected to the recirculation pump inlet 122. In this case the pump 110 could be omitted.

As mentioned, an aspect of this disclosure is for retrofitting existing chiller systems. In order to provide the clean in place capability for existing systems, this disclosure provides retrofit kits for conversion of chiller tanks from manual cleaning to cleaning in place.

In an example, a retrofit kit may include a cover having a plurality of distribution nozzles, wherein the cover is configured to be installed over the tank opening, wherein the distribution nozzles can be directed into the tank and the other interior parts thereof.

In an example, a retrofit kit may include one or more valves configured to switch a recirculation pump discharge from a heat exchanger to one or more distribution nozzles on the tank.

In an example, a retrofit kit may include one or more valves configured to switch a tank outlet from a drain to a second pump inlet.

In an example, the existing programmable logic controller can be updated for automated cleaning in place. In such example, a retro-fit kit may include updated software for automating the cleaning in place.

In an example, a retrofit kit may include a programmable logic controller having a non-transitory computer readable medium having instructions stored thereon to execute the following step: switching a recirculation pump outlet from a heat exchanger to distribution nozzles located on the tank to discharge cleaning fluid in the interior of the tank.

In an example, the non-transitory computer readable medium further has instructions stored thereon to execute the following steps: switching a tank outlet from a drain to a second pump inlet: starting the recirculation pump to pump cleaning fluid into the tank through the distribution nozzles; and starting the second pump to recirculate cleaning fluid from the tank back to the recirculation pump.

In an example, the non-transitory computer readable medium further has instructions stored thereon to execute the following steps: after a first time period of operating the recirculation pump and second pump to recirculate cleaning fluid, switching the tank outlet from second pump inlet to the drain outlet to dispose of the cleaning fluid.

In an example, a method of cleaning a poultry chiller 100 having a tank 102 with a conveyor 134 on the interior, a cleaning fluid reservoir 106, a recirculation pump 108 having a pump inlet 122 connected to a reservoir outlet and a pump outlet 120 is switchable to a heat exchanger 104 and a plurality of distribution nozzles 128, 130, 132 on the tank, a second pump 110 having a pump inlet connected to a tank outlet 146 and a pump outlet connected to a reservoir inlet, the tank outlet is switchable to a drain and the second pump inlet, and the method comprises the following steps (e) to (h) to perform recirculation cleaning 302:
  (e) filling the reservoir with a cleaning fluid 316;
  (f) switching the tank outlet to the second pump inlet 314;
  (g) pumping the cleaning fluid from the reservoir to inside the tank through the distribution nozzles with the recirculation pump 318: and
  (h) pumping the cleaning fluid from the tank to the reservoir with the second pump 318.

In an example, the method can further include step (i) performing steps (g) and (h) for a timed period 320.

In an example, prior to performing recirculation cleaning 302 steps (e) to (i), a flush sequence 300 can be performed including the steps (a) to (d):
  (a) filling the reservoir with flush water 306;
  (b) switching the tank outlet to the drain 310;
  (c) switching the outlet from the recirculation pump to bypass the heat exchanger to discharge the recirculation pump outlet to the distribution nozzles 308: and
  (d) pumping the flush water from the reservoir to inside the tank through the distribution nozzles with the recirculation pump to flush the tank 312.

In an example, after performing recirculation cleaning 302 steps (e) to (i), a rinse sequence 304 can be performed including the steps (j) to (1):
  (j) switching the tank outlet to the drain to empty the tank of cleaning fluid 322;
  (k) filling the reservoir with rinse water 326; and
  (l) pumping the rinse water from the reservoir to inside the tank through the distribution nozzles with the recirculation pump to rinse the tank of the cleaning fluid 326.

While illustrative embodiments have been illustrated and described, it will be appreciated that various changes can be made therein without departing from the spirit and scope of the invention.

The embodiments of the invention in which an exclusive property or privilege is claimed are defined as follows:

1. A poultry chiller, comprising:
  a tank having a conveyor within the interior for urging poultry for movement along the tank, wherein the tank has an opening extending along a length of the tank;
  a cleaning system for automatically cleaning the interior of the tank, the cleaning system comprising a plurality of distribution nozzles extending along the tank to direct cleaning fluid to the interior surface of the tank;
  a cleaning fluid reservoir;
  a recirculation pump having a pump inlet connected to a reservoir outlet and to a tank outlet, a recirculation pump outlet is connected to a heat exchanger and the plurality of distribution nozzles on the tank, the outlet of the heat exchanger is connected to an inlet on the tank, wherein one or more valves close the pump outlet to the heat exchanger while opening the pump outlet to the plurality of distribution nozzles, and the one or more valves close the pump outlet to the plurality of distribution nozzles while opening the pump outlet to the heat exchanger.

2. The poultry chiller of claim 1, further comprising a programmable logic controller having a non-transitory computer readable medium having instructions stored thereon to control the recirculation pump.

3. The poultry chiller of claim 2, wherein the instructions execute the following steps:
  controlling the outlet from the recirculation pump to bypass the heat exchanger to discharge the recirculation pump outlet to the distribution nozzles, with the recirculation pump, pumping cleaning fluid from the reservoir to the distribution nozzles, and with the recirculation pump, pumping the cleaning fluid into the tank through the distribution nozzles, wherein after injecting, the cleaning fluid is collected and returned to a recirculation pump inlet.

4. The poultry chiller of claim 2, further comprising a second pump having a pump inlet connected to a tank outlet and a pump outlet connected to a reservoir inlet, wherein the non-transitory computer readable medium further has instructions stored thereon to execute the following step:

with the second pump, pumping the cleaning fluid from the tank outlet to the reservoir inlet.

5. The poultry chiller of claim 2, further comprising a second pump having a pump inlet connected to a tank outlet and a pump outlet connected to a reservoir inlet, the tank outlet is switchable to a drain and the second pump inlet, and wherein the non-transitory computer readable medium further has instructions stored thereon to execute the following steps:

(a). switching the tank outlet to the second pump inlet;
(b) switching the outlet from the recirculation pump to bypass the heat exchanger to discharge the recirculation pump outlet to the distribution nozzles;
(c) pumping cleaning fluid from the reservoir to inside the tank through the distribution nozzles with the recirculation pump;
(d) pumping the cleaning fluid inside the tank from the tank outlet to the reservoir inlet, and
(e) performing steps (c) and (d) for a period of time to clean the tank.

6. The poultry chiller of claim 5, wherein the non-transitory computer readable medium further has instructions stored thereon to execute the following step:

after step (e), perform step (f) switching the tank outlet to the drain to empty the tank of cleaning fluid.

7. The poultry chiller of claim 5, wherein the non-transitory computer readable medium further has instructions stored thereon to execute the following steps:

before step (a), switching the tank outlet to the drain; and
pumping water from the reservoir outlet to inside the tank through the distribution nozzles with the recirculation pump to flush the tank.

8. The poultry chiller of claim 6, wherein the non-transitory computer readable medium further has instructions stored thereon to execute the following step:

(g) pumping water from the reservoir outlet to inside the tank through the distribution nozzles with the recirculation pump to rinse the tank of cleaning fluid.

9. The poultry chiller of claim 1, wherein the tank opening extends laterally from a first side wall to a second side wall of the tank; and the poultry chiller further comprises:

a cover over the opening, wherein the cover has the distribution nozzles being directed to the interior of the tank.

10. The poultry chiller of claim 9, further comprising a recirculation pump with inlet and outlet, wherein the pump inlet is connected to a tank outlet and the pump outlet is connected to the distribution nozzles.

11. The poultry chiller of claim 9, further comprising distribution nozzles on the first and second side walls of the tank.

12. The poultry chiller of claim 11, wherein the distribution nozzles are placed on the tank directed inward and not extending past the inside diameter of the tank.

13. The poultry chiller of claim 11, wherein the distribution nozzles are placed in a row extending longitudinally along the tank on both the first and second side walls.

14. The poultry chiller of claim 11, wherein the distribution nozzles of a cylindrical tank are placed at 4 o'clock, 8 o'clock, and 12 o'clock position, wherein the nozzles at the 12 o'clock position are located on the cover.

15. The poultry chiller of claim 9, wherein the opening is at a top of the tank.

16. The poultry chiller of claim 1, wherein the tank opening extends laterally from a first side wall to a second side wall of the tank; and further comprises:

a recirculation pump with inlet and outlet, wherein the pump inlet is connected to a tank outlet and the pump outlet is connected to an inlet of a heat exchanger, and a heat exchanger outlet is connected to an inlet on the tank, and the pump outlet is further connected to a plurality of distribution nozzles located at the tank.

17. The poultry chiller of claim 16, further comprising one or more automated valves to configure the pump outlet to bypass the heat exchanger to the plurality of distribution nozzles.

18. The poultry chiller of claim 16, further comprising a second pump with inlet and outlet, wherein the second pump inlet is connected to a tank outlet, and the tank outlet is switchable from the second pump inlet to a drain.

19. A retro-fit kit for installing on a poultry chiller tank having a conveyor within the interior, wherein the tank has an opening extending along a length of the tank and laterally extending from a first side wall to a second side wall of the tank, the kit comprising:

a cover having a plurality of distribution nozzles, the cover is configured to be installed over the tank opening, wherein the distribution nozzles are directed into the tank;
wherein the poultry chiller further comprises a recirculation pump with inlet and outlet, wherein the pump inlet is connected to a tank outlet and the pump outlet is connected to an inlet of a heat exchanger, and a heat exchanger outlet is connected to an inlet on the tank, and the pump outlet is further connected to the plurality of distribution nozzles on the cover, wherein one or more valves close the pump outlet to the heat exchanger while opening the pump outlet to the plurality of distribution nozzles, and the one or more valves close the pump outlet to the plurality of distribution nozzles while opening the pump outlet to the heat exchanger.

20. The retro-fit kit of claim 19, the kit comprising a programmable logic controller, having a non-transitory computer readable medium having instructions stored thereon to execute the following step:

switching a recirculation pump outlet from a heat exchanger to distribution nozzles located on the tank to discharge cleaning fluid in the interior of the tank.

21. The retro-fit kit of claim 20, wherein the non-transitory computer readable medium further has instructions stored thereon to execute the following steps:

switching a tank outlet from a drain to a second pump inlet;
starting the recirculation pump to pump cleaning fluid into the tank through the distribution nozzles; and
starting the second pump to recirculate cleaning fluid from the tank back to the recirculation pump.

22. The retro-fit kit of claim 21, wherein the non-transitory computer readable medium further has instructions stored thereon to execute the following steps:

after a first time period of operating the recirculation pump and second pump to recirculate cleaning fluid, switching the tank outlet from second pump inlet to the drain outlet to dispose of the cleaning fluid.

23. A method of cleaning a poultry chiller having a tank with a conveyor on the interior, a cleaning fluid reservoir, a recirculation pump having a pump inlet connected to a reservoir outlet and a pump outlet is switchable to a heat exchanger and a plurality of distribution nozzles on the tank, one or more valves close the pump outlet to the heat exchanger while opening the pump outlet to the plurality of distribution nozzles, and the one or more valves close the pump outlet to the plurality of distribution nozzles while opening the pump outlet to the heat exchanger, a second pump having a pump inlet connected to a tank outlet and a pump outlet connected to a reservoir inlet, the tank outlet is switchable to a drain and the second pump inlet, the method comprising the following steps:
- (a) closing the pump outlet to the heat exchanger while opening the pump outlet to the plurality of distribution nozzles;
- (b) filling the reservoir with water;
- (c) switching the tank outlet to the drain;
- (d) switching the outlet from the recirculation pump to bypass the heat exchanger to discharge the recirculation pump outlet to the distribution nozzles;
- (e) pumping the water from the reservoir to inside the tank through the distribution nozzles with the recirculation pump to flush the tank;
- (f) filling the reservoir with a cleaning fluid;
- (g) switching the tank outlet to the second pump inlet;
- (h) pumping the cleaning fluid from the reservoir to inside the tank through the distribution nozzles with the recirculation pump;
- (i) pumping the cleaning fluid from the tank to the reservoir with the second pump;
- (j) performing steps (h) and (i) for a timed period;
- (k) switching the tank outlet to the drain to empty the tank of cleaning fluid;
- (l) filling the reservoir with water; and
- (m) pumping water from the reservoir to inside the tank through the distribution nozzles with the recirculation pump to rinse the tank of the cleaning fluid; and
- (n) closing the pump outlet to the plurality of distribution nozzles while opening the pump outlet to the heat exchanger.

* * * * *

UNITED STATES PATENT AND TRADEMARK OFFICE
CERTIFICATE OF CORRECTION

| | | |
|---|---|---|
| PATENT NO. | : 12,089,603 B2 | Page 1 of 1 |
| APPLICATION NO. | : 17/204567 | |
| DATED | : September 17, 2024 | |
| INVENTOR(S) | : Darin L. Chancellor | |

It is certified that error appears in the above-identified patent and that said Letters Patent is hereby corrected as shown below:

In the Claims

| Column | Line | |
|---|---|---|
| 13 | 22 | Claim 5, delete "(a)." and insert -- (a) -- |
| 13 | 30 | Claim 5, delete "inlet," and insert -- inlet; -- |
| 16 | 14 | Claim 23, delete "(i) performing" and insert -- (j) performing -- |
| 16 | 17 | Claim 23, delete "water; and" and insert -- water; -- |

Signed and Sealed this
Sixth Day of May, 2025

Coke Morgan Stewart
*Acting Director of the United States Patent and Trademark Office*